United States Patent [19]

Le Rat et al.

[11] Patent Number: 4,761,748
[45] Date of Patent: Aug. 2, 1988

[54] METHOD FOR VALIDATING THE VALUE OF A PARAMETER

[75] Inventors: Guy Le Rat, Torcy; Jean-Marc Lagache, Paris, both of France

[73] Assignee: Framatome & Cie, Courbevoie, France

[21] Appl. No.: 775,567

[22] Filed: Sep. 13, 1985

[30] Foreign Application Priority Data

Sep. 13, 1984 [FR] France .................. 84 14065

[51] Int. Cl.⁴ .............. G06F 11/14; G06F 15/36
[52] U.S. Cl. ............................ 364/551; 371/68
[58] Field of Search .............. 364/550, 551; 371/68

[56] References Cited

U.S. PATENT DOCUMENTS

| | | | |
|---|---|---|---|
| 3,476,922 | 11/1969 | Yiotis | 371/68 |
| 3,976,860 | 8/1976 | Gerstenmeier et al. | 364/724 |
| 4,276,648 | 6/1981 | Tomlinson | 371/68 |
| 4,472,806 | 9/1984 | Blair | 371/68 |
| 4,520,483 | 5/1985 | Arita et al. | 371/68 |

FOREIGN PATENT DOCUMENTS

3011892 10/1981 Fed. Rep. of Germany.

Primary Examiner—Felix D. Gruber
Attorney, Agent, or Firm—Pollock, Vande Sande & Priddy

[57] ABSTRACT

The method according to the invention consists of sampling, at successive times separated by constant or nonconstant time intervals, signals supplied by redundant channels measuring or calculating the parameter and validating a value of said parameter, as a function of a sample of N values of each channel, in which $N \geq 2$. In a preferred manner, each sample of N values is modeled by a straight line using the method of least squares and the validated value of the parameter is worked out as a function of the inter-coherent models.

11 Claims, 6 Drawing Sheets

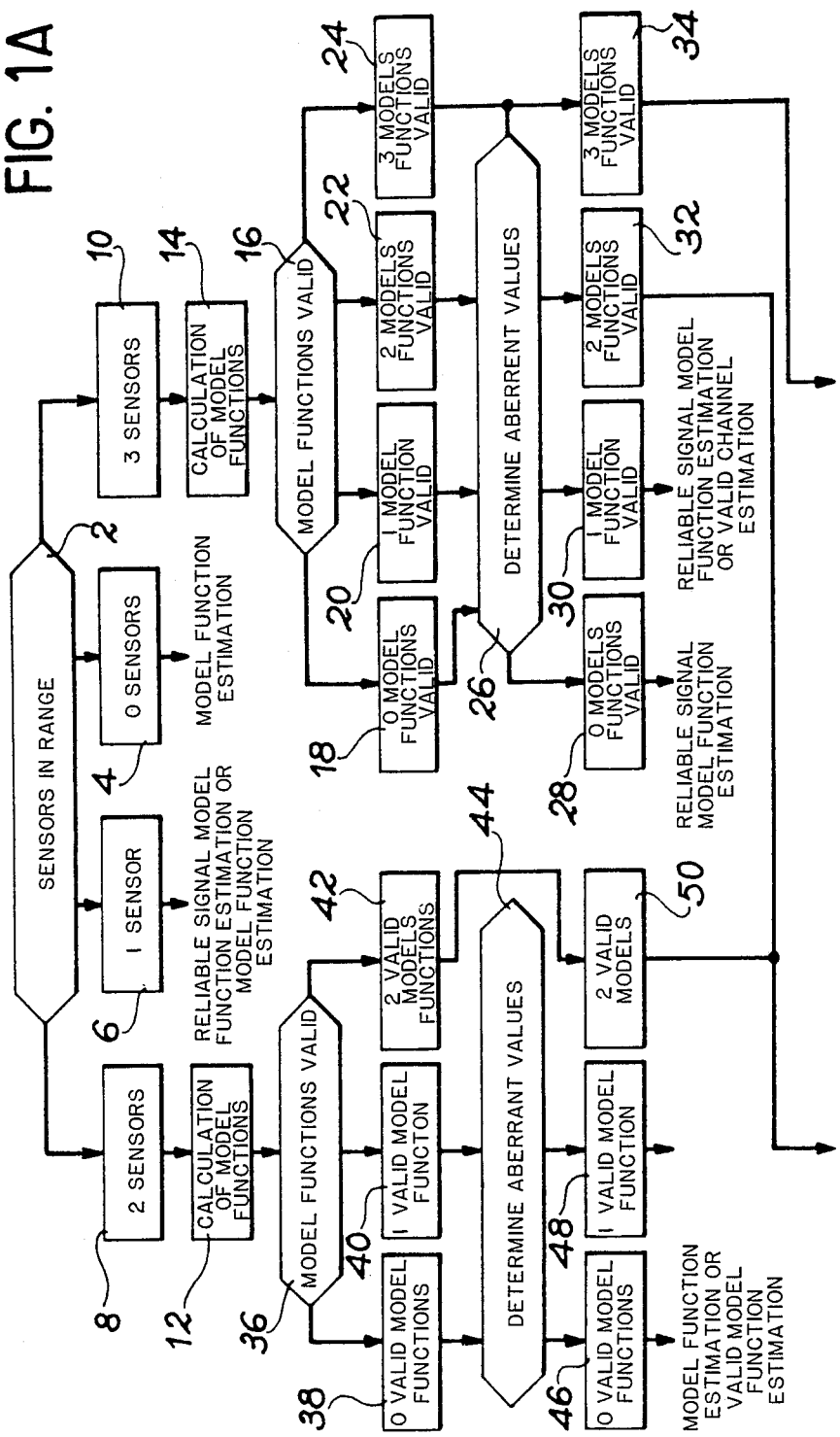

TE = 310
DECAY OF SENSOR 3

TE = 316
DECAY OF SENSOR 1

TE = 304
DECAY OF SENSOR 3

TE = 317
DECAY OF SENSOR 3

METHOD FOR VALIDATING THE VALUE OF A PARAMETER

BACKGROUND OF THE INVENTION

The present invention relates to a method for validating the value of a parameter. The method applies to all fields where, particularly for security or productivity reasons, it is vital to know a reliable value of a parameter, physical quantity or the like. In this case, use is made of a plurality of sensors and/or redundant calculating means for the measurement or calculation of the values of said parameter. One value of this parameter is validated as a function of these values. The invention relates to such a validation method.

The need to be sure that a physical value is correct has greatly increased, particularly with the industrial use of nuclear energy. Certain incidents have revealed the consequences of defective instrumentation leading either to untimely shutdowns, which are prejudicial to productivity, or to incorrect analyses on the part of operators, which can lead to dangerous decisions.

To obviate this, in per se known manner, use is made of a plurality of sensors which consequently produce a redundancy so that, by comparison, the value of the parameter can be more reliably evaluated, even in the presence of a defective sensor. The sensors can optionally be replaced by models which, as a function of indirect measurements, deduce one value of the parameter by calculation. The replacement of the sensors by models is of a standard nature in the aerospace industry, in order to reduce weight.

The validation method must in particular make it possible to determine failures of a sensor or model, such as a bias, drift, signal saturation, noise added to the measurement, or aberrant values.

Methods are known which make it possible to detect one or more of these shortcomings. However, none of the known methods make it possible to detect all these shortcomings. Moreover, these methods are generally able to detect a difference between the measuring channels, but are not always able to identify which particular channel or channels is defective.

A first or so-called signs test method is known, which makes it possible to validate the value of a parameter measured by two paired sensors. The method consists of studying the difference $d_i = x_i - y_i$, in which $x_i$ and $y_i$ are sampled values of signals supplied by the two sensors at time i, in which $i \geq 1$. The number k of positive differences $d_i$ follows a binomial law defined by the size n of each sample and by the probability $p = 0.5$.

The principle of the validation consists of storing the signs of n last differences between the two series of measurements. An alarm is triggered as soon as the number of differences of the same sign exceeds $n/2 + n_0$, in which $n_0$ is a threshold dependent on a compromise between the desired sensitivity and the false alarm probability.

This method suffers from the disadvantage that in principle, it is not sensitive to the amplitude of the difference. As from the time when one measurement is greater than or less than the other for an adequately long time, even with a very limited variation, detection is inevitable without any possibility of regulating the sensitivity. Thus, this method requires sensors having performance levels which are not realistic in an industrial situation (strict calibration, absolute linearity over the entire measurement scale, identical response time, etc).

This method is not able to detect noise, if the latter is more or less centered relative to the valid signal, or an aberrant value, but is able to detect a bias, even if it is very small. A signal saturation or drift are also correctly detected. This method is not very suitable for the validation of a measurement. Thus, it sometimes validates incoherent measurements (noise) and sometimes triggers false alarms (limited bias).

A second or so-called pairing method is known, which also consists of studying the difference $d_i$ defined hereinbefore. If the two sensors supply coherent signals, the difference or variable $d_i$ is a normal law of mean 0 and standard deviations $\sigma_d$. The variable $m_i$ equal to:

$$\left( \sum_{j=1}^{i} d_j \right) / N,$$

then follows a normal law of mean 0 and standard deviation $\sigma_d / \sqrt{N}$. Thus, the variable t equal to $m_d \cdot \sqrt{N} / \sigma_d$ follows a Student-Fischer law with n-1 degrees of freedom.

A fault is detected if the observed value of the variable t exceeds a threshold r determined as a function of the Student-Fischer law table.

This test does not react well to certain defects, such as noise, rapid drifts and a bias in the presence of aberrant values. Thus, this method only makes it possible to detect a shortcoming representing a displacement of the signals.

A third method is known, in which there are n redundant sensors, in which n exceeds 3 and which gives, at each sampling instant, n observations $X_1$, Xhd 2 ... $X_n$. At each sampling time, one defines:

$$\text{the arithmetic mean: } x = \frac{1}{n} \sum_{i=1}^{n} X_i$$

$$\text{the range of the observation: } \delta = X_{max} - X_{min}$$

$$\text{the centre of the range: } \hat{x} = \tfrac{1}{2}(X_{max} - X_{min}).$$

In normal operation, the measurements are normally distributed about the true value m. When a measurement moves away from the normal distribution, x and $\hat{x}$ move away from m, but more sensitively for $\hat{x}$ than for x.

This property is utilized for the discordance or difference detection. At each sampling time, the test relates to the ratio $$Q = \left| \frac{\hat{x} - x}{\delta} \right|.$$

If Q exceeds a certain predetermined threshold, tne most offcentered measurement is eliminated and a further validation takes place with the n-1 remaining measurements.

This method requires an order of redundancy equal to or greater than 3, because, if $n = 2$, Q is constantly zero. In the case where the order of redundancy is equal to 3, when Q exceeds the threshold, the most offcentered measurement is eliminated and it is no longer possible to carry out a new validation on the basis of the two remaining measurements. Whatever the threshold value, this method leads to incorrect detections in normal situations, or to non-detections in abnormal situations (large drifts or bias).

A fourth method is known, which is called the probability ratio sequential test. This method utilizes statistical properties of time samples of the signal, which characterize the deviation $x_3(t)$ between two measurements $x_1(t)$ and $x_2(t)$ supplied by two redundant sensors.

The test deals with the same quantity as the pairing method test. The interest of this method is based on the fact that it takes into account the notions of the probability of false alarms and non-detections. The methods making it possible to evaluate these probabilities are based on a knowledge of distribution laws which, often, is not very effective in an industrial situation, the choice of the thresholds necessary for the validation method generally empirically gaining in refinement when used industrially. This method suffers from the same shortcomings as the pairing method and only makes it possible to reveal a displacement between the two signals.

A fifth method is known, which is used when two direct measurements are available and when a third measurement can be obtained by correlation. The detection of a difference between the two direct channels is obtained by a comparison of the variation signal at fixed thresholds. In the case of a difference, use is made of the third measuring channel for locating the defective channel. The validated measurement is that which is closest to said third measurement obtained by correlation. In the case of non-discordance, the validated measurement is the mean value of the two signals from two sensors.

This method is much more elaborate than the preceding methods, because it does not use the detection theory. The test is punctiform and relates to the variation between the signals at a given time. This method is not particularly satisfactory, because it does not take account of the history of the signals. However, when a fault appears, the response is immediate.

Finally, there is a sixth method, which was developed by Electricité de France. It relates to a complex theory and is applicable for any redundancy order, equal to or greater than 2.

This so-called parity space method consists of defining and displaying a vector, which reflects the discordance between the different channels. The standard of this parity vector makes it possible to detect a discordance or difference and its direction makes it possible to locate the defective channel.

The method consists of comparing the measurements from the redundant sensors in pairs. Two measurements are coherent when their tolerance range, defined by the precision characteristics, the hysteresis and the linearity of the sensor intersect, so that it is possible a priori to predict that the true value (unknown) of the measured quantity is at this intersection.

The detection method is punctiform and relates to the present time, without taking account of the past and consequently loses much information. This approach is not very suitable for an optimum detection of all types of fault. For example, in the case of a drift of one among these sensors, this method is unable to rapidly determine which is the defective sensor. Moreover, when a multiple fault appears, the method is unable to produce information. In general terms, the parity space method does not make it possible to establish the type of fault and in fact merely detects a discordance between the redundant channels.

The above description has shown the shortcomings of the known validation methods. It has shown that it is easy to provide a validation method, which reacts well to a particular type of fault, but it is difficult to provide such a method which behaves well in the case of the five most commonly encountered faults. With the known methods, there are often cases of nondetection of faults, or of incorrect detection leading to a false alarm.

The validation methods using statistical characteristics of the difference between two measurement channels would not appear to be suitable in connection with the problem of validating measurements. Thus, these methods assume a gaussian distribution of the differences. However, under dynamic conditions or when a fault appears, this hypothesis is null and void. It is then necessary to process a large sample in order to carry out a detection under conditions of adequate reliability, which is to the detriment of the response time.

Moreover, a punctiform validation method is unable, as soon as the difference between two channels exceeds a certain threshold, to produce a reliable information. Such a method deals with the information of the present time. The past is not taken into account, but in certain cases the knowledge thereof can help in taking a decision..

SUMMARY OF THE INVENTION

The invention relates to a method for validating a measurement, which obviates the disadvantages of the known methods. According to the invention, the validated value of the parameter at a time T is determined as a function, for each measuring channel, of a sample of N values measured at N sampling times preceding the time T.

The method according to the invention takes account of the history of the signals. However, unlike in the aforementioned known methods, the method according to the invention does not statistically process the samples, but instead defines, for each channel, a model of the signal supplied by said channel as a function of the sample thereof. Such model building makes it possible to evaluate the tendency of the signal of each channel. This model building also makes it possible to detect a possible discordance or difference between the channels by a comparison of these tendencies at several levels. In the case of a difference between the channels, the method makes it possible, with the aid of models of each channel, to extrapolate a reliable value of the parameter.

More specifically, the present invention relates to a method for validating the value of a parameter at successive times separated by constant or non-constant time intervals in which, at each of these times, signals supplied by channels measuring or calculating said parameter are sampled and in which the validated value of said parameter is determined as a function of a sample of N values of each channel, in which N is an integer equal to or exceeding 2.

In preferred manner, the method consists of replacing each sample of N values of a channel by a channel model, testing the validity of said channel model by a dispersion criterion, defining a model for the parameter and determining the validated value of the parameter as a function of the valid channel models only.

In a preferred manner, the model of each channel is the straight line obtained from the sample of the channel by the method of least squares, said channel model being valid if the dispersion coefficient between said sample and the line is below a predetermined dispersion threshold.

For example, said dispersion coefficient can be equal to the sum of the squares of the distances between one point of the sample and the corresponding point on the line modeling said sample. The more the sample is dispersed around the line, the higher the dispersion coefficient.

According to a feature of the method according to the invention, when a channel model is not valid, the value whose distance to the corresponding point on the straight line is greatest is eliminated.

A sample of size N-1 is obtained for which the associated straight line is calculated. This process can be iterated until a line is obtained, whose associated dispersion coefficient is below the predetermined threshold. However, as the size of the sample becomes increasingly small, the representativity of the modeled line is ever less great. Beyond a minimum sample size, it is consequently preferable to not take account of the corresponding channel.

According to another feature of the method according to the invention, when a channel model is not valid, the sample of said channel is modified by replacing the value moving furthest from the mean value of the values of said sample by said mean, and the channel model is replaced by the channel model associated with the modified sample.

This method makes it possible to detect and eliminate an aberrant value in the sample of a channel. It is possible to search for and eliminate a second aberrant value, if the channel model associated with the modified sample is not valid. In this way, it is possible to validate the channel model by successively eliminating all the aberrant values. However, the more the values in the sample are replaced, the less the channel model is reliable. It is therefore accepted that a sample containing more than a predetermined number of aberrant values cannot be represented by a valid channel model. This channel will not then be taken into account for working out the value of the parameter.

According to another feature of the method according to the invention, the coherence of the valid models is tested. This test makes it possible to detect the channels having a defect, such as a drift, a bias, a noise and a saturation.

According to another feature of the method according to the invention, if, at a sampling time, the number of valid, coherent models is less than a predetermined number, the last model worked out will be retained as the model for the parameter.

According to another feature of the method according to the invention, the validated value of the parameter is determined as a function of the valid, coherent models, if their number is equal to or exceeds said predetermined number and as a function of the model for the parameter in the opposite case.

BRIEF DESCRIPTION OF THE DRAWINGS

The invention is described in greater detail hereinafter relative to non-limitative embodiments and the attached drawings, wherein show:

FIGS 1A and 1B a flow diagram explaining the operation of the method according to the invention.

FIG. 2 the three measured signals are coherent.
FIG. 3 bias on the signal supplied by sensor 3.
FIG. 4 drift of signal supplied by sensor 1.
FIG. 5 break of sensor 3.
FIG. 6 aberrant values on the signal supplied by the sensor 3.
FIG. 7 noise on the signal supplied by sensor 2.
FIG. 8 bias on the signal supplied by sensors 1 and 3.

DETAILED DESCRIPTION OF THE PREFERRED EMBODIMENTS

Figure 1B:
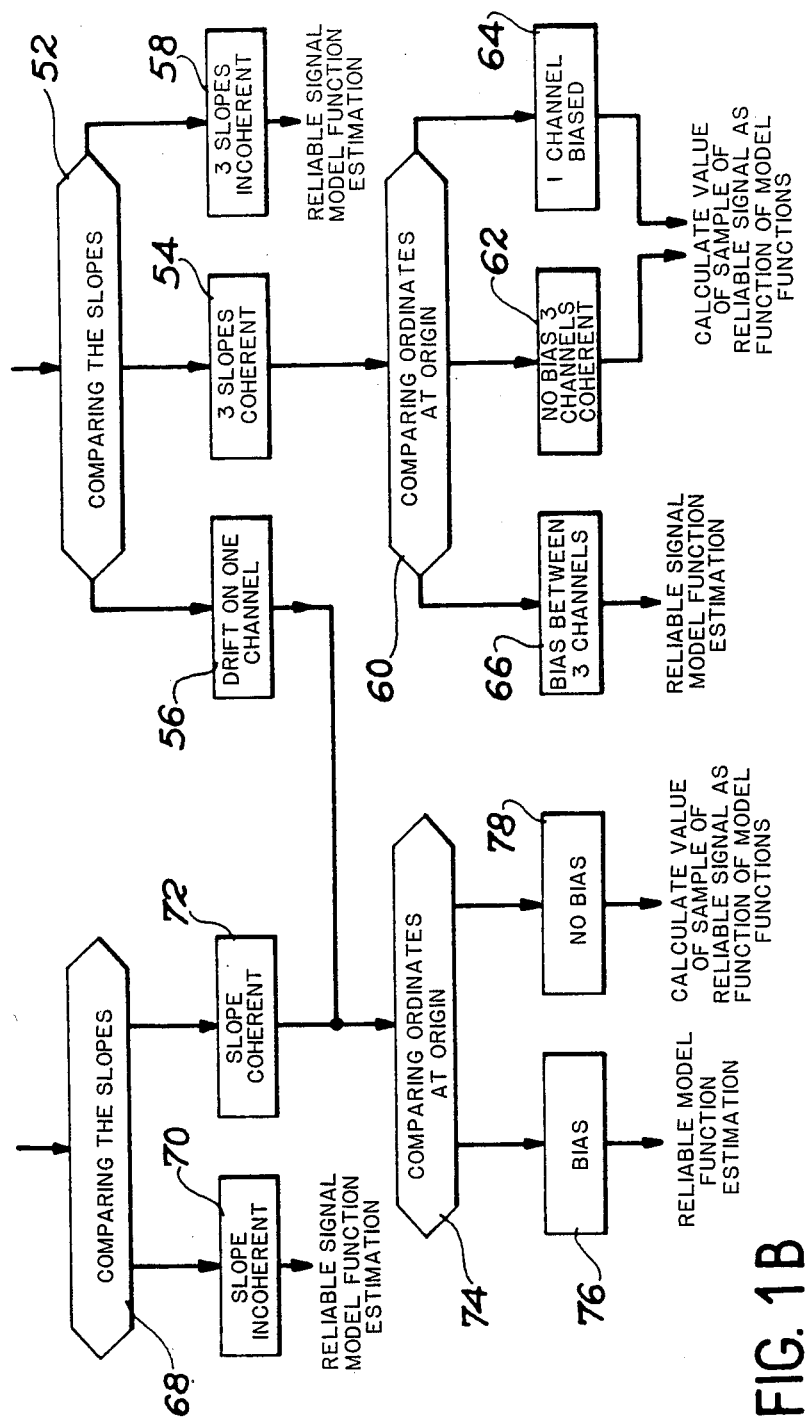

The method according to the invention is applicable for an order of redundancy equal to or greater than 2. The flow diagram of Figs 1A and 1B explaining the operation of the method according to the invention has been represented in the special case, which frequently occurs, where the redundancy order equals 2.

The signal supplied by the three redundant sensors or models are sampled with a time T. At time K. T, one value of the parameter is validated whilst considering, for each sensor, the sample of size N representing the N last values assumed by the parameter measured by said sensor.

The validation of a value of the parameter takes place in the following way. Firstly, in step 2 the flow diagram, tests are carried out to establish whether the value measured at time K. T of the signal supplied by each sensor is included in the range of admissible values by said sensor. One channel out of the range is not taken into account in the subsequent processing operations. Following this test, one of the four states designated 4, 6, 8 and 10 occurs. In states 4 and 6, there is at the most one sensor in the range. It is consequently not possible to determine a valid value of the parameter by comparing between several sensors. The value of the parameter is consequently determined by extrapolation from stored models. In states 8 and 10, it is possible to carry out a comparison between the signals supplied by the different sensors.

In each of these cases, for each sensor, the sample of the N last values assumed by the parameter measured by said sensor is modeled by a straight line calculated by the method of least squares. For each sensor, the line obtained constitutes a linear approximation of the signal supplied. This linear approximation permits an easier comparison of the signals supplied by each of the sensors and also permits an extrapolation through the knowledge of the tendency of each signal.

The processing operations carried out as a function of whether state 8 or 10 prevails are relatively similar. The tests are identical, but the method for determining the value of the parameter can differ, as a function of the result of these tests. A description will firstly be given of the operation of the method corresponding to state 10.

In step 14, for each of the three sensors taken into consideration, the slope $M_i$ and the ordinate of the origin of the sample $D_i$ of the line modeling, by the method of least squares, the sample of sensor i, in which i is between 1 and 3, are calculated. For each sensor, calculation also takes place of the dispersion coefficient $D_i$, which reflects the dispersion of the sample points around the straight line.

This dispersion coefficient is positive. With increasing proximity to the straight line of the modeled sample, the weaker the said coefficient. For each sensor, the dispersion coefficient obtained is compared with a predetermined dispersion threshold. This comparison is the object of test 16 of the flow diagram. A model is valid and is taken into account in the remainder of the processing operation, if its dispersion coefficient is below the dispersion threshold. Following this test, four states are possible and correspond to 0, 1, 2 or 3 valid models. These states are respectively designated 18, 20, 22 and 24.

In the case where at least one of the models is recognised as being non-valid, this can be due either to an excessive dispersion of the modeled sample, or to one or more aberrant values in a sample which also has a low dispersion. In the second case, the model can be made valid, if said aberrant value is eliminated.

Test 26 applied to the samples in the case of states 18, 20 or 22 has the object of seeking an aberrant value in a sample. For each sample of a non-valid model this test consists of eliminating the most dispersed value, i.e. that having the greatest distance from the corresponding point on the modeled straight line. The sample then retains no more than N-1 values. From the geometrical standpoint, each value of the sample and the modeled straight line are represented in a plane with the time on the abscissa and the amplitude on the ordinate, the eliminated value being that for which the difference between said value and its projection on the straight line, parallel to the ordinate axis, is the greatest.

If the dispersion coefficient associated with the modified sample is below the dispersion threshold, it is considered that the eliminated value is an aberrant value of the sample and the model corresponding to the modified sample is valid. However, if the dispersion coefficient is again above the dispersion threshold, the sample still contains one or more aberrant values. Test 6 for seeking aberrant values is then repeated. If after the elimination of a predetermined number of aberrant values, e.g. N/5, in which N is the size of the sample, the model is still not valid, the channel is considered to be defective and is not taken into consideration for calculating the validated value of the parameter.

According to a variant, for each sample of a non-valid model, test 26 can consist of calculating the mean value of the sample values and then, by the method of least squares, calculating the straight line and the correlation coefficient corresponding to the sample in which the value which has moved furthest away from said mean is replacedby the latter.

In the same way as in the preceding test, the test can be repeated until a predetermined number e.g. N/5 aberrant values has been replaced.

At the following sampling time, the validity of said channel is again investigated on the basis of the sample constituted by the N most recent measured values of the signal of said channel, i.e. the sample including the possible aberrant values eliminated at the preceding sampling time for working out the channel model.

At the end of this test, it is possible to pass from one of the states 18, 20 or 22 to one of the states 28, 30, 32 or 34, which respectively correspond to 0, 1, 2 or 3 valid models.

Tests 16 and 26 carried out on models of samples of three sensors of state 10 made it possible to define the valid models on the basis of the comparison of each, the value of the parameter will be determined.

The same tests are carried out on the two sensors of state 8. For the samples of each of these sensors, in step 12, the straight line modeling said sample is calculated by the method of least squares. The correlation coefficients between said sample and said straight line are also calculated. A validity test 36, identical to test 16, is carried out on these models. One is then in one of the three states 38, 40 or 42, respectively corresponding to 0, 1 or 2 valid models. If at least one of the models is non-valid, test 44 for seeking the aberrant values is carried out. This test is identical to test 26. Following this test, the state is 46 if no model is valid, or 48 if the model is valid, or 50 if both models are valid.

In the case where the number of valid models is equal to or below 1 and the number of sensors supplying a signal in the range is equal to 2 (state 8) or equal to 3 (state 10), the value of the parameter can no longer be determined by comparison of the models, so that said value is extrapolated.

In the case where the number of valid models is equal to or exceeds 2, it is possible to compare these models. This makes it possible to detect a drift of a signal, by comparing slopes of the straight lines of the channel models, whilst a signal bias can be detected by comparing ordinates at the origin of the straight lines of the channel models.

A description will now be given of the function of the method when the three models are valid. It is necessary to start at state 34 and test 52 is applied consisting of comparing the differences of the slopes of the straight lines of the models in pairwise manner with a predetermined threshold. When one of the differences between two channels exceeds that threshold, it is considered that there is a drift between the two channels.

Following test 52, there is either state 54 if the slopes of the three straight lines of the models are coherent, or state 56 if there is a drift on one channel, or state 58 if the slopes of the three straight lines of the models are incoherent.

If the three slopes are coherent (state 54), there is a pairwise comparison of the difference of the ordinates at the origin of the straight lines of the models with a predetermined threshold. When a difference exceeds this threshold, it is considered that there is a bias between these channels. If the ordinates at the origin of the straight lines of the three models (state 62), the value of the parameter is estimated as a function of these three models. If one channel is biased (state 64), the value of the parameter is determined as a function of the two coherent channels. Finally, if there is a bias between these three channels (state 66), the value of the parameter must be extrapolated.

The processing performed in states 32 or 50, in which two models are valid, is parallel to the processing performed in the case where the three models are valid. A comparison test 68 is carried out on the slopes of the straight lines of the two models. If the difference between these slopes exceeds a predetermined threshold, the models are incoherent (state 70) and the parameter value must be extrapolated. If these slopes are coherent (state 72), test 74 comparing the ordinates at the origin of the lines of the two models is performed. If a bias is found between these ordinates, i.e. if the difference between the ordinates exceeds a predetermined threshold, the parameter value is determined by extrapolation. In the opposite case (state 78), the parameter value is determined as a function of the two models.

In summarizing, when at least two of the three sensors supply coherent signals, the parameter value is determined as a function of the models of the channels of these signals. In the opposite case, the parameter value is determined by extrapolation, as a function of the stored model.

When, at a sampling time, at least two channels are coherent, on the one hand the validated value of the parameter is determined as a function of the models of the valid channels and on the other hand, on the basis of said channels, a model is worked out for calculating the parameter value. More specifically, the validated value of the parameter is a function of the value of the signal of each sensor defined at the sampling time by the channel model of said sensor. For example, it is possible to choose as the validated parameter value, the mean value of said signal values, the maximum value of said signal values and the minimum value of said signal values.

The stored model can simply be a straight line, whose slope is equal to the mean of the slopes of the coherent channel models and whose ordinate at the origin is equal to the mean of the ordinates at the origin of the coherent channel models. However, the slope (respectively the ordinate at the origin) of the stored model can also be defined by the maximum value of the slopes (respectively ordinates at the origin) of the valid, coherent lines, or the minimum or some other value.

This model is used for extrapolating the value of the parameter when, at a sampling time, the channels are not coherent and it is consequently not possible to determine a value of the parameter as a function of valid models. This model is used for working out a value of the parameter in states 4, 6, 28, 30, 46, 48, 58, 70, 66 and 76.

This model is only updated again, when at least two channels are coherent. If during several sampling periods, the channels are not coherent, it is necessary to make use of an increasing old model. The extrapolated value then becomes increasingly less reliable. If the number of sampling times from the storage of the model is excessive, e.g. exceeding a predetermined value, it may be preferable not to use this model for working out the value of the parameter.

This is possible when a sensor functions correctly, as in states 6, 30 and 48. In this case, if a valid channel model can be associated with the sample of the values supplied by said sensor, the validated value of the parameter can be advantageously determined by extrapolation using said channel model.

When the model for calculating the parameter is old and no sensor functions correctly, such as in states 4, 28 and 46, the parameter value cannot be determined with an adequate reliability.

The validation method according to the invention has high performance characteristics. It makes it possible to detect isolated faults, such as a bias, a drift, a signal break, aberrant values of an additive noise. It also makes it possible to identify the channel having defects. Finally, it makes it possible to recognise the few cases where a reliable parameter value cannot be supplied.

FIGS. 2 to 8 are graphs illustrating the validated value of the parameter, according to the method of the invention, as a function of values measured by three redundant sensors. On each of these graphs, each channel has been sampled for 60 seconds at a period of 0.1s. At each sampling time, the parameter value is determined as a function of the sample comprising, for each channel, 30 measured values. On each of these samples, the presence of 6 aberrant values is accepted, i.e. a density of 20%. For the different thresholds used in the tests, the following values have been retained:
correlation threshold : 0.86
drift threshold : 0.3 unit per second
bias threshold : 5 units.

The object of the value retained for the bias threshold is an easier display, in order that the three signals supplied by the sensors and the validated signal are not superimposed. In practice, this threshold is much lower.

Each graph consists of three curves $S_1$, $S_2$ and $S_3$, which are the signals supplied by the three redundant sensors. The validated value of the parameter as a function of time is represented by signal S. On each of the graphs, the asscissa axis designates the sampling times and the ordinate axis the amplitude of the signals in arbitrary units.

Figure 2:
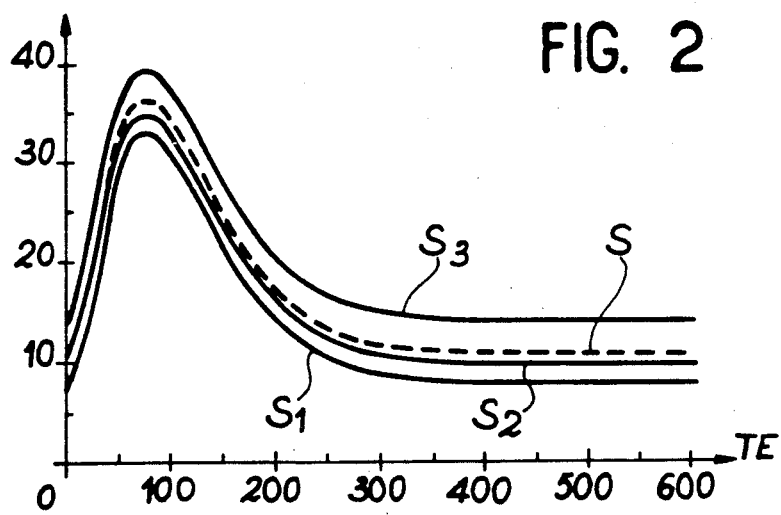
FIGS. 2 to 8 graphs, each of which shows the three signals supplied by three redundant sensors and the validated value of the given parameter, using the method of the invention and as a function of said signals, these graphs respectively representing the following cases.

FIG. 2 corresponds to the case where the signals supplied by the three sensors are coherent (state 62, FIG. 1B). The value of signal S at each sampling time is then determined e.g. by the mean of the tendencies of the three signals supplied by the sensors.

Figure 3:
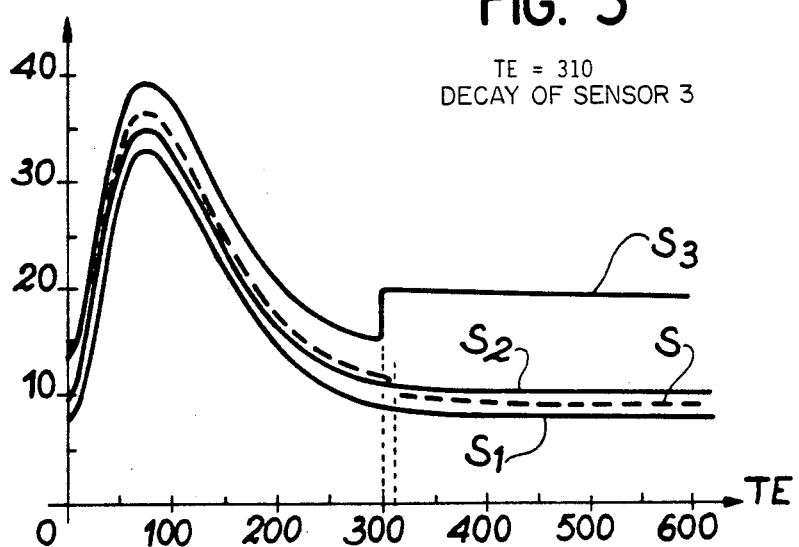

FIG. 3 shows the case where signal $S_3$ has a bias at sampling time 300. This defect is detected at time TE, one second after the appearance of the defect. Signal $S_3$ is then no longer taken into account for the working out of signal S. The large bend in the validated signal S at time 310 is due to the high bias threshold value. In practice, this discontinuity is much smaller, because the bias threshold value is lower than that chosen.

Figure 4:
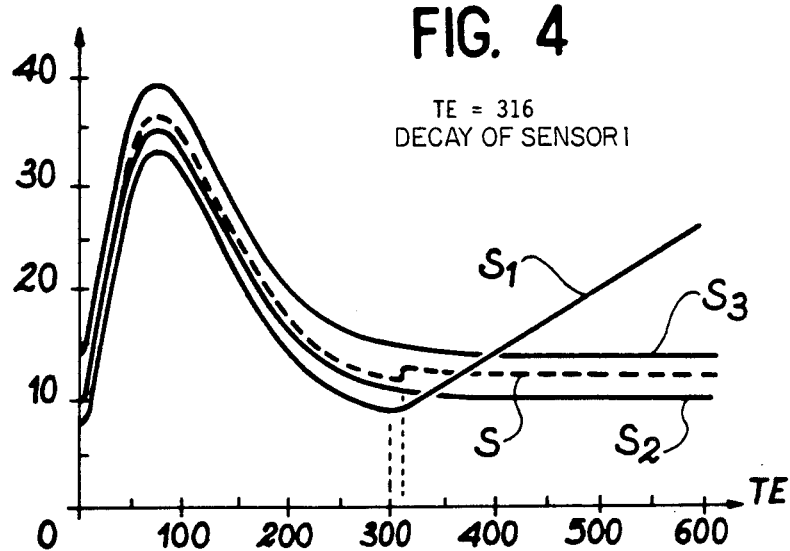

In FIG. 4, signal $S_1$ has a drift as from sampling time 300 (state 56, then 76, FIG. 1A). This sensor fault is detected 1.6s after the appearance thereof, i.e. at time TE equal to 316. The validated signal $S_3$, then undergoes a displacement corresponding to the abandoning of taking into account of signal $S_1$.

Figure 5:
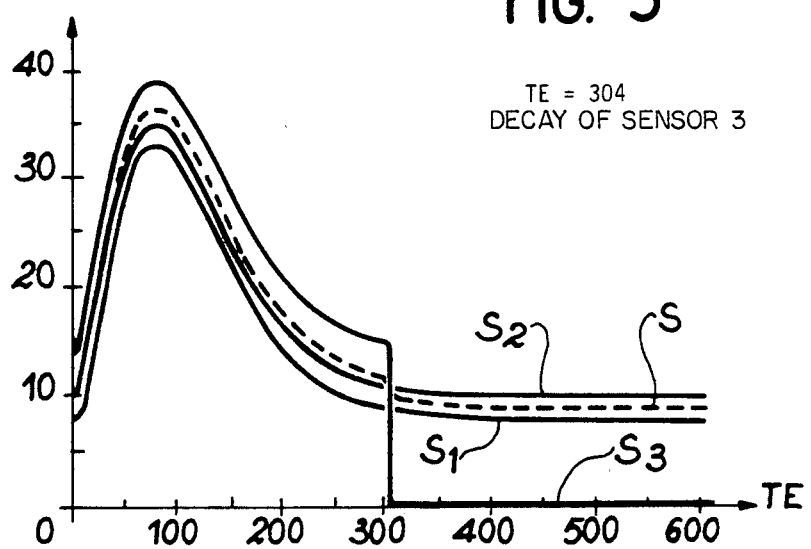

In FIG. 5, there is a break of signal $S_3$ at sampling time 304 (state 8, FIG. 1A). Signal $S_3$ consequently passes outside the range. The alarm is triggered 0.4s after the appearance of said signal break.

Figure 6:
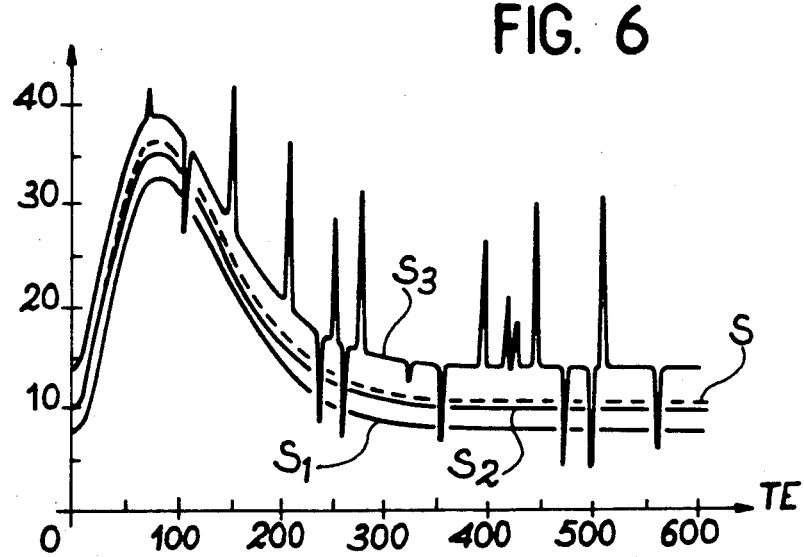

In FIG. 6, signal $S_3$ has aberrant values. As the density of these aberrant values does not exceed 20%, i.e. 6 aberrant values among the 30 measured values constituting a sample, no fault is detected. The method according to the invention makes it possible to recognise these aberrant values and eliminate them from signal $S_3$, so as to produce a valid model of said signal. The validated signal S is consequently obtained from three valid models of signals supplied by the sensors.

Figure 7:
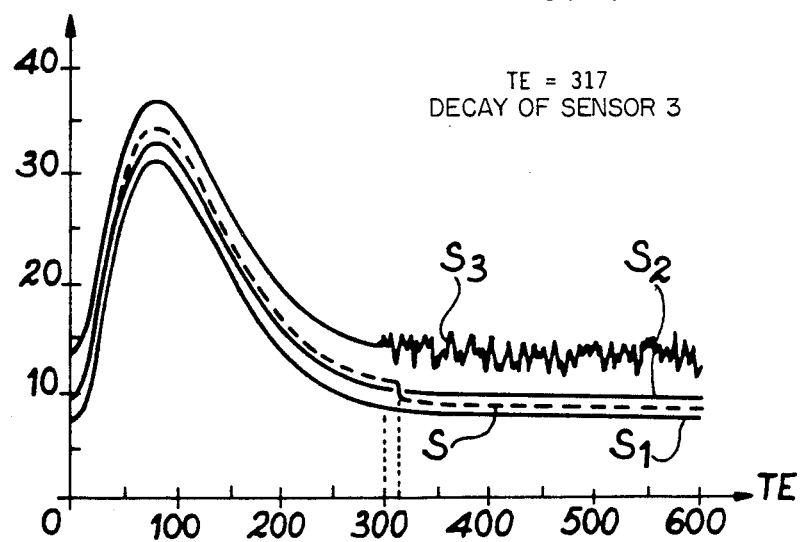

In FIG. 7, a noise is detected from time 317 on signal $S_3$, i.e.a density of aberrant values which exceeds the fixed threshold. This noise is detected 1.7s after its appearance. As from this time, only signals $S_1$ and $S_2$ are taken into account for working out the validated signal S.

FIGS. 3 to 7 show the excellent behaviour of the validation method according to the invention, when one of the three sensors has a fault. Thus, in all cases, the validated signal can be worked out, the fault is detected and its nature identified very rapidly.

Figure 8:
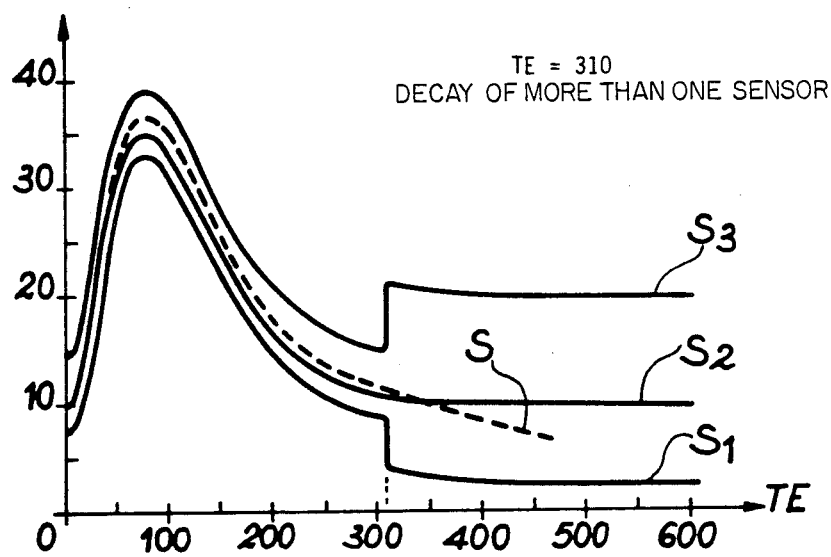

FIG. 8 shows the case where two signals have a bias as from sampling time 300 (state 66, FIG. 1B). This double fault is detected at the end of 1 second. Signal S is then extrapolated with the aid of the tendency of the phenomenon stored prior to the appearance of the fault. This extrapolation is continued for 150 sampling seconds after the appearance of the fault. The model stored is then considered as being too old to supply a reliable signal S.

Thus, the method according to the invention makes it possible to supply, for a certain time following the appearance of a multiple fault, a signal S which is very probably close to the true value of the parameter. This is important because it is known, by experience, that it is preferable during the appearance of a multiple fault to continue to supply the operator with information, even if its reliability is suspect. This gives the operator time to take the necessary steps.

Figure 9:
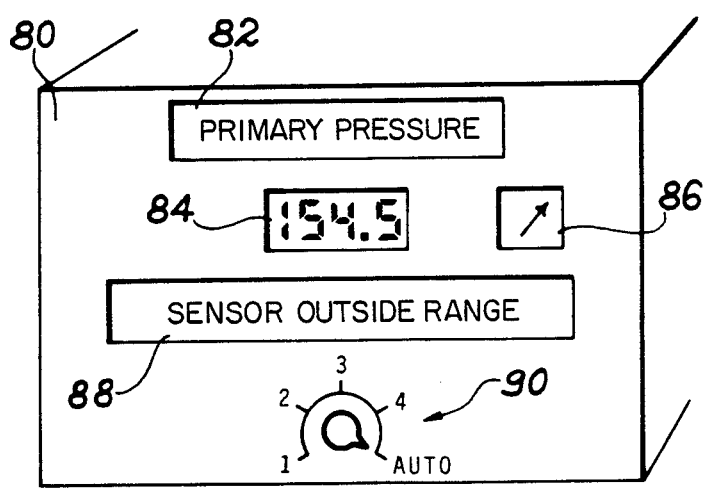
FIG. 9 the use of the validation method according to the invention in the determination of the primary pressure in a nuclear reactor core.

The information can be supplied to the operator by a table, like that diagrammatically shown in FIG. 9. This table 80 has a zone 82 identifying the measured parameter, in this case the primary pressure in a nuclear reactor, a readout 84 indicating the validated parameter value and a readout 86 indicating the tendency.

It can also advantageously comprise a readout 88 supplying messages on the state of the sensors measuring the primary pressure. The messages can be displayed in different colours, as a function of the seriousness of the fault.

The table can finally be completed by a commutating switch 90, which makes it possible to select either automatic operation or, in the case of multiple faults, one channel on the basis of which the parameter value is determined.

What is claimed is:

1. A signal validation method for generating a reliable signal from a plurality of redundant received signals, comprising the following steps:
    simultaneously measuring samples of each of said received signals;
    memorizing the values of the last N samples ($N \geq 2$) of each received signal;
    determining a plurality of model functions corresponding to the N memorized samples for each of said received signals, said model functions being defined as a plurality of parameters representing an approximate function for said N memorized samples;
    calculating a dispersion coefficient representing the difference between each sample of the N memorized samples and a sample, determined by the model functions;
    validating said model functions by comparing said dispersion coefficient with a predetermined dispersion threshold, said model function being valid if said dispersion coefficient is smaller than said predetermined dispersion threshold; and
    generating said reliable signal by determining a value for a sample of said reliable signal as a function of at least some of said valid model functions.

2. A signal validation method according to claim 1, wherein said approximate function is a straight line, the parameters of said approximate function being the slope and the ordinate at the origin, said parameters having values determined by the least square method.

3. a signal validation method according to claim 2, comprising the further steps;
    for each model function which is not valid, discarding from the N memorized samples of a respective received signal a sample having the greatest deviation from a sample determined by said model function;
    determining a new model function corresponding to a remaining N-1 memorized samples of said received signal;
    calculating a new dispersion coefficient representing the deviation between each sample of the set of remaining N-1 samples and samples determined by the model function; and
    comparing said new dispersion coefficient with said predetermined dispersion threshold, said new model function being called valid if said new dispersion coefficient is smaller than said predetermined dispersion threshold.

4. A signal validation method according to claim 2 further comprising:
    for each model which is not valid, discarding from the N memorized sample of a respective received signal the sample for which the difference between the value of said sample and the mean value of the samples of said N memorized samples function is the greatest;
    replacing said discarded sample by a sample whose value is equal to said means value, to produce a set of modified N memorized samples;
    determining a new model function for the modified N memorized samples set;
    calculating a new dispersion coefficient representing the deviation between each sample of said modified N memorized samples and samples determined by the model function; and
    comparing said new dispersion coefficient with said predetermined dispersion threshold, said new model function being called valid if said new dispersion coefficient is smaller than said predetermined dispersion threshold.

5. A signal validation method according to claim 1, further comprising testing the coherence of the valid model functions of the different received signals, and determining the value of a sample of the reliable signal as a function of the coherent valid model functions.

6. A signal validation method according to claim 5, wherein said coherence is tested by measuring at least one of either drift, bias, noise or saturation of the valid models.

7. A signal validation method according to claim 6 wherein:
    the model function for each of the received signals is determined as a straight line, the slope and the ordinate at the origin being determined with relation to the set of N memorized samples of a respective received signal according to the least square method; and
    the difference of the slopes of two model functions and a predetermined drift threshold, for each pair of model functions, are compared and the valid model functions having slopes exceeding said threshold corresponding to a drifted received signal are discarded when determining the value of the sample of the reliable signal.

8. A signal validation method according to claim 7, wherein at each sample time, a reliable signal model function is determined, said reliable signal model function being a straight line whose slope is equal to the mean value of the slopes of the valid, coherent model functions for the received signals, and whose ordinate at the origin is the mean value of the ordinate at the origin of said valid, coherent model functions for the received signals.

9. A signal validation method according to claim 8, wherein at each sampling time, the number of valid, coherent model functions is determined and compared with a predetermined number, a new reliable signal model function being determined if said number is equal or exceeds said predetermined number and the reliable signal model function determined at the previous sampling time being retained if said number is below said predetermined number.

10. A signal validation method according to claim 6 wherein:
- the model function for each of the received signals is a straight line, the slope and the ordinate at the origin being determined with relation to the set of N samples of a respective received signal according to the least square method;
- a comparison is done between the difference of the ordinate at the origin of two model functions and a predetermined drift threshold to determine which model functions are biased for each pair of model functions, and the valid model functions corresponding to a biased received signal are discarded when determining the value of the sample of the reliable signal.

11. A signal validation method according to claim 8, wherein when, at a sampling time, the number of valid coherent model functions for the received signals is below a predetermined number, the value of the sample of the reliable signal at said sampling time is equal to the value, at said sampling time, of a reliable signal model function determined at a previous sampling time.

* * * * *